US012480660B2

(12) United States Patent
Pruitt et al.

(10) Patent No.: US 12,480,660 B2
(45) Date of Patent: Nov. 25, 2025

(54) SYSTEM AND METHOD FOR FORCED AIR CONTROL IN A KAMADO-STYLE COOKER

(71) Applicant: Spider Grills, LLC, Athens, GA (US)

(72) Inventors: Joseph Pruitt, Athens, GA (US); Kyle Aasness, Athens, GA (US)

(73) Assignee: Spider Grills, LLC, Athens, GA (US)

(*) Notice: Subject to any disclaimer, the term of this patent is extended or adjusted under 35 U.S.C. 154(b) by 925 days.

(21) Appl. No.: 17/591,316

(22) Filed: Feb. 12, 2022

(65) Prior Publication Data
US 2022/0163209 A1 May 26, 2022

Related U.S. Application Data

(63) Continuation-in-part of application No. 17/353,467, filed on Jun. 21, 2021, now Pat. No. 11,644,197,
(Continued)

(51) Int. Cl.
F24B 5/02 (2006.01)
A47J 36/32 (2006.01)
(Continued)

(52) U.S. Cl.
CPC ............. *F24B 5/023* (2013.01); *A47J 36/321* (2018.08); *A47J 37/0704* (2013.01);
(Continued)

(58) Field of Classification Search
CPC .. A47J 36/321; A47J 37/0704; A47J 37/0754; F23N 3/005; F23N 3/085;
(Continued)

(56) References Cited

U.S. PATENT DOCUMENTS 4,520,791 A   6/1985  Chamberlain
4,747,781 A   5/1988  Patenaude
(Continued)

FOREIGN PATENT DOCUMENTS

CA   2991584 C1 *  9/2020  ............. A47J 36/06
CN   206709121 U1 * 12/2017  ............. F24B 1/182
(Continued)

OTHER PUBLICATIONS

Machine translation of WO 2005039367 A1 performed on Feb. 6, 2025, Le (Year: 2005).*
(Continued)

*Primary Examiner* — Brian W Jennison
*Assistant Examiner* — Kevin Guanhua Wen
(74) *Attorney, Agent, or Firm* — Smith Tempel Blaha LLC; Matthew T. Hoots

(57) ABSTRACT

A system for a forced air flow into a kamado-style cooker comprises a control unit and an adapter defining an airflow duct with an entrance aperture and an exit aperture. The adapter is configured to removably mount over a lower damper port in a kamado-style cooker such that the exit aperture is aligned with the lower damper port. The control unit comprises an electric fan, one or more sensor input ports, and an airflow exit duct. The control unit is configured to separably mate with the adapter such that the airflow exit duct of the control unit is received by the entrance aperture of the adapter. Advantageously, a forced air flow generated by the electric fan, in response to a temperature signal input, passes out of the control unit, through the adapter, and into a body portion of the kamado-style cooker to encourage, facilitate and manage combustion within the cooker.

8 Claims, 9 Drawing Sheets

Related U.S. Application Data which is a continuation of application No. 16/953,695, filed on Nov. 20, 2020, now Pat. No. 11,125,438.

(51) Int. Cl.
| | | |
|---|---|---|
| *A47J 37/07* | (2006.01) | |
| *F23N 3/00* | (2006.01) | |
| *F23N 3/08* | (2006.01) | |
| *F24B 1/19* | (2006.01) | |
| *F24B 13/00* | (2006.01) | |

(52) U.S. Cl.
CPC .......... *A47J 37/0754* (2013.01); *F23N 3/005* (2013.01); *F23N 3/085* (2013.01); *F23N 3/087* (2013.01); *F24B 1/19* (2013.01); *F24B 13/008* (2013.01); *F23N 2225/08* (2020.01); *F23N 2233/06* (2020.01); *F23N 2233/08* (2020.01)

(58) Field of Classification Search
CPC .. F23N 3/087; F23N 2225/08; F23N 2233/06; F23N 2233/08; F24B 1/19; F24B 13/008
See application file for complete search history.

(56) References Cited

U.S. PATENT DOCUMENTS

| | | | |
|---|---|---|---|
| 5,154,159 A * | 10/1992 | Knafelc et al. | A47J 37/00 126/25 |
| 5,168,860 A | 12/1992 | Kibourian | |
| 6,223,737 B1 | 5/2001 | Buckner | |
| 8,479,720 B1 | 7/2013 | Figueroa | |
| 8,800,542 B1 | 8/2014 | Kennington | |
| 8,851,062 B2 * | 10/2014 | Cedar et al. | F24B 1/00 |
| 10,092,135 B2 * | 10/2018 | DeBruler | A47J 37/07 |
| 10,595,540 B1 | 3/2020 | Knight | |
| 10,638,881 B1 | 5/2020 | Holt | |
| 2006/0016482 A1 * | 1/2006 | Berens et al. | F16K 15/16 137/512.15 |
| 2008/0138194 A1 | 6/2008 | Wei | |
| 2008/0233861 A1 | 9/2008 | Jenkins | |
| 2009/0056695 A1 | 3/2009 | Cosgrove | |
| 2009/0215380 A1 | 8/2009 | Lin | |
| 2011/0168158 A1 | 7/2011 | Barkhouse | |
| 2013/0061765 A1 | 3/2013 | Reinhart | |
| 2014/0090634 A1 | 4/2014 | Li | |
| 2016/0374509 A1 | 12/2016 | Blomberg | |
| 2017/0150847 A1 | 6/2017 | Feng | |
| 2017/0202395 A1 | 7/2017 | Lomonaco | |
| 2018/0008093 A1 | 1/2018 | Parker | |
| 2018/0376614 A1 | 12/2018 | Xiong | |
| 2019/0053664 A1 * | 2/2019 | Chapman | A47J 37/07 |
| 2019/0234647 A1 | 8/2019 | Chen | |
| 2019/0245296 A1 | 8/2019 | Murad | |
| 2019/0309955 A1 | 10/2019 | Castillo | |
| 2020/0093145 A1 | 3/2020 | Powell | |
| 2020/0178727 A1 * | 6/2020 | Brennan | A47J 37/07 |
| 2020/0178728 A1 | 6/2020 | Brennan | |
| 2020/0214503 A1 | 7/2020 | Altenritter | |

FOREIGN PATENT DOCUMENTS

| | | | |
|---|---|---|---|
| FR | 2860965 | 4/2005 | |
| WO | WO-2005039367 A1 * | 5/2005 | .......... A47J 37/0754 |

OTHER PUBLICATIONS

Machine translation of CA 2991584 C1 performed on Feb. 13, 2025, Aboujassoum et al. (Year: 2020).*

Machine translation of CN 206709121 U1 performed on Feb. 13, 2025, Wu et al. (Year: 2017).*

* cited by examiner

SYSTEM AND METHOD FOR FORCED AIR CONTROL IN A KAMADO-STYLE COOKER

BACKGROUND

The present invention relates to outdoor grilling and smoking solutions and, more particularly, to a novel system for enabling forced air control in a kamado-styled cooker designed for use with charcoal.

Kamado-styled cookers designed for use with a charcoal briquette fuel source, such as a KamadoJoe®, are becoming more and more common in the marketplace. As one of ordinary skill in the art of kamado-styled cookers would recognize, air flow is usually controlled manually through lower and upper dampers located in the cooker's body and lid, respectively. With skill and knowledge, the manual dampers (lower and/or upper) of a typical kamado-styled cooker may be periodically adjusted and set by a user to control cooking temperature and/or smoke retention within the cooker.

The skill and knowledge required by a kamado cooker user to effectively manipulate and control air flow with manual dampers only comes with lots of experience and cooking intuition. Therefore, there is a need in the art for a system and method that does not require a user to master the use of manual dampers in order to achieve great cooking results from a kamado-style cooker. More specifically, there is a need in the art for a retrofittable forced air control system in a kamado-styled cooker.

SUMMARY

Exemplary embodiments of a system and method for bimodal air control in a kettle-style grill are disclosed. Certain embodiments are configured to be detachably mounted to the exterior of a kettle-styled grill such as, but not limited to, a Weber® charcoal grill. When mounted to the kettle-styled grill, a plenum-like component directs air flows to the interior of the grill's kettle via the kettle's lower body damper holes. A manually adjustable intake damper in the plenum component allows, restricts, or prevents a drawn ambient air flow into the plenum component. Separately, a forced air flow generated by a fan may also be provided into the plenum component. Ash that falls out of the kettle's damper holes falls through the plenum component and is captured in an ash receptacle that is removably mounted to the plenum component. In this way, embodiments of the solution do not require significant, if any, modification to the kettle-styled grill in order for the kettle-styled grill to use the bimodal air control system. Embodiments may also include temperature loop control of the fan.

An exemplary embodiment of a system for bimodal air control in a kettle-style grill having one or more damper holes in a lower portion of its kettle comprises 1) one or more positionable damper blades associated with the one or more damper holes in the lower portion of the kettle, each damper blade operable to be positioned such that it opens, restricts or closes off its associated damper hole; 2) a damper plenum having an open top and an open bottom, the damper plenum comprising a manually adjustable intake damper and a forced-air input port, wherein the manually adjustable intake damper is mechanically connected to the one or more positionable damper blades; 3) an ash receptacle component removably attached to the damper plenum; and 4) an air control unit comprising a variable speed fan.

The air control unit may further comprise a temperature sensor in electrical communication with an electronic controller configured to vary the speed of the fan. The electronic controller may be operable to apply a proportional-integral-derivative control algorithm and may also be configured to wirelessly communicate with a remote user device.

The damper plenum is configured to be mounted to the kettle-style grill such that the open top establishes a seal around an external area of the kettle that includes the one or more damper holes. The air control unit is attached to the damper plenum such that a forced air flow generated by the fan enters the damper plenum through the forced-air input port. And a drawn ambient air flow enters the damper plenum through the manually adjustable intake damper when the manually adjustable intake damper is in an open state.

Further to the exemplary embodiment, when the manually adjustable intake damper is in an open state, the one or more positionable damper blades are positioned in the kettle such that the one or more damper holes are closed off. Similarly, when the manually adjustable intake damper is in a closed state, the one or more positionable damper blades are positioned in the kettle such that the one or more damper holes are fully open. And, when the manually adjustable intake damper is in a partially open state, the one or more positionable damper blades are positioned in the kettle such that the one or more damper holes are partially restricted. Ash exiting the grill's kettle through the one or more damper holes is captured in the ash receptacle which is below the plenum.

Another exemplary embodiment of a system for bimodal air control in a kettle-style grill having one or more damper holes in a lower portion of its kettle comprises: 1) means for opening, restricting or closing off each of the one or more damper holes; 2) means for adjusting a drawn ambient air flow between fully open, fully closed, and partially open states; 3) means for adjusting a forced air flow; and 4) means for capturing ash expelled from the kettle. The means for adjusting the drawn ambient air flow operates simultaneously to adjust the means for opening, restricting or closing off each of the one or more damper holes. The drawn ambient air flow and the forced air flow both enter the kettle through the one or more damper holes.

When the means for adjusting the drawn ambient air flow between fully open, fully closed, and partially open states is in an open state, the means for opening, restricting or closing off each of the one or more damper holes operates to close off the one or more damper holes. Similarly, when the means for adjusting the drawn ambient air flow between fully open, fully closed, and partially open states is in a closed state, the means for opening, restricting or closing off each of the one or more damper holes operates to open the one or more damper holes. And, when the means for adjusting the drawn ambient air flow between fully open, fully closed, and partially open states is in a partially open state, the means for opening, restricting or closing off each of the one or more damper holes operates to restrict the one or more damper holes.

The means for adjusting a forced air flow comprises a temperature sensor in electrical communication with an electronic controller configured to vary a speed of a fan. The electronic controller may be operable to apply a proportional-integral-derivative control algorithm and may be configured to wirelessly communicate with a remote user device. Alternative embodiments of the solution are configured for conversion of a kamado-style cooker. Such embodiments leverage a damper port in a lower side portion of a kamado-style cooker to receive a removable adapter and control unit. The control unit is operable to respond to temperature sensor inputs by modulating an airflow generated by a fan.

An exemplary embodiment of the solution in the form of a system for providing a forced air flow into a kamado-style cooker comprises a control unit and an adapter defining an airflow duct with an entrance aperture and an exit aperture. The adapter is configured to removably mount over a lower damper port in a kamado-style cooker such that the exit aperture is aligned with the lower damper port. The control unit comprises an electric fan, one or more sensor input ports, and an airflow exit duct. The control unit is configured to separably mate with the adapter such that the airflow exit duct of the control unit is received by the entrance aperture of the adapter. Advantageously, a forced air flow generated by the electric fan passes out of the control unit, through the adapter, and into a body portion of the kamado-style cooker to encourage, facilitate and manage combustion within the cooker.

The control unit may comprise an electronic controller in electrical communication with the electric fan. A temperature sensor may be in electrical communication with the electronic controller via the one or more sensor input ports (or, alternatively, in wireless communication with the controller) such that the electronic controller may execute an algorithm to vary speed of the electronic fan based on the signal input from the temperature sensor. The electronic fan may vary speed of the electronic fan according to a proportional-integral-derivative control algorithm.

The electronic controller may further be configured to wirelessly communicate with a remote user device, such as a smart phone, such that a user of the remote device may configure the controller and/or modify selection of algorithms and/or receive and display feedback data. The electronic controller may further comprise a graphical user interface.

The entrance aperture of the adapter (which receives the airflow exit duct of the control unit) may be lower than the exit aperture of the adapter when the adapter is removably mounted over a lower damper port in a kamado-style cooker. In this way, the adapter may define a tortuous path for an airflow generated by the fan of the control unit such that air entering the adapter via the entrance aperture is required to change flow directions as it passes through and out of the adapter into the cooker. The adapter may also comprise a baffle positioned to mitigate a backflow from the cooker into the control unit.

The control unit may also comprise a magnet positioned to interface with a surface of the adapter and, in this way, separably attach and secure the control unit to the adapter. A flapper component may be juxtaposed to the electric fan to mitigate or prevent backflow into the fan.

DETAILED DESCRIPTION

Figure 1:
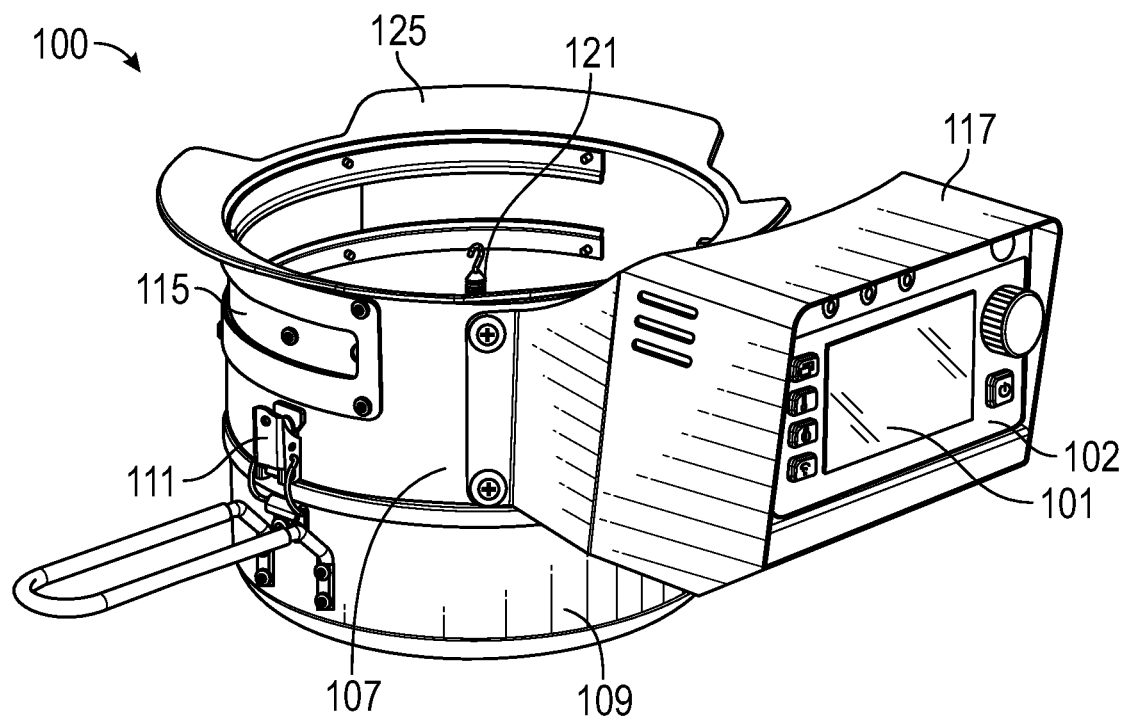
FIG. 1 illustrates an exemplary embodiment of a bimodal air control system for kettle-styled grills according to the solution.

Various embodiments, aspects and features of the present invention encompass solutions for conversion of grills or cookers from manual damper control to automatic forced air control. One exemplary family of embodiments are directed toward a system and method for bimodal air control in a kettle-styled grill (e.g., a Weber® grill designed for use with a briquette charcoal fuel). Another exemplary family of embodiments are directed toward a system and method for forced air control in a kamado-style cooker. As one of ordinary skill in the art would understand and recognize, kettle-styled grills and kamado-styled cookers are primarily designed for manual manipulation of damper(s) to control an air flow through the kettles or cookers.

In this description, the terms "kettle" and "cooker body" are used interchangeably unless specifically indicated otherwise. Also, "grill" and "cooker" are used interchangeably unless specifically indicated otherwise. The lower body of a kettle-styled grill is typically referred to in the industry a as a "kettle" and is constructed of a metal. By contrast, the lower body of a kamado-styled cooker is typically referred to in the industry as the cooker "body" or the like and is constructed of a ceramic or clay. Importantly, both a kettle grill and a kamado cooker typically leverage a damper in the lower body (i.e., the "kettle") and a damper in the lid to control air flow through the grill/cooker. For these reasons, although the specific configurations envisioned for certain embodiments of the solution may be particularly suited for retrofit of a kettle grill or, alternatively, retrofit of a kamado cooker, one of ordinary skill in the art will recognize that use of the terms "kettle" or "cooker body" or "grill" or "cooker" do not suggest that aspects of any particular embodiment are necessarily limited in application to retrofit of either a kettle grill or a kamado cooker. That is, to avoid unnecessary redundancy, it will be understood that description of embodiments of the solution within the context of a kettle grill may also be applicable to embodiments of the solution within the context of a kamado cooker.

When a typical kettle-styled grill or kamado-style cooker is used as intended, charcoal is placed in the kettle of the grill or cooker body and ignited. A cooking grate is suspended over the top of the charcoal. Thermal energy generated by the burning charcoal radiates upward toward the grate and cooks any food item placed thereon. To control temperature, rate of burn and smoke retention, charcoal grills and cookers usually rely on a somewhat crude, manual damper-type control. Some grills and cookers incorporate the damper on the top of a lid that mates to and over the lower kettle or cooker body. Other grills and cookers, however, such as what is commonly known as a Weber® branded grill or a KamadoJoe® branded kamado cooker, incorporate a damper at the bottom of the kettle or cooker body (in addition to a damper on the lid of the grill or cooker), thereby providing means for control of air directly to, and through, the burning charcoal.

As one of ordinary skill in the art would acknowledge, temperature, burn rate and smoke retention are all key parameters to be controlled when using a kettle-styled grill or kamado cooker. And so, a user's experience and skill in leveraging the manual dampers may have a direct impact on the quality of the food being cooked. To improve control of the air flow in a kettle-styled grill or kamado cooker, incorporation of an electric fan and temperature control loop may be used in lieu of the manual dampers.

Advantageously, embodiments of the solution are configured to detachably integrate to a kettle-styled grill having lower dampers in the kettle, without requiring modification of the kettle, and provide a user with a bimodal option to use the grill in a manual damper mode or in an auto-damper mode. Similarly, other embodiments of the solution are configured to detachably integrate to the lower damper of a kamado-styled cooker, without requiring modification of the kamado body, and provide a user with a bimodal option to use the cooker in a manual damper mode (i.e., with the solution removed from the cooker) or in an auto-damper mode (i.e., with the solution installed into the damper). For embodiments directed to the use of a kettle-styled grill, when in the manual damper mode, a user is allowed to rely on manual setting and manipulation of the lower dampers, while in the auto-damper mode the user may rely on an electric fan to force air through the lower damper holes in response to a temperature control loop. Similarly, for embodiments directed to use with a kamado cooker, when installed in the lower damper of the cooker the solution allows a user to rely on an electric fan to force air through the lower damper in response to a temperature control loop. As will be better understood from the attached figures and the following description, embodiments of the solution may be integrated onto an existing kettle-styled grill or kamado-styled cooker without modifying the kettle or cooker (such as cutting a hole in the kettle) or rendering the lower dampers inoperable for ash removal and/or manual damping.

Exemplary Kettle-Styled Grill Embodiment

Figure 2:
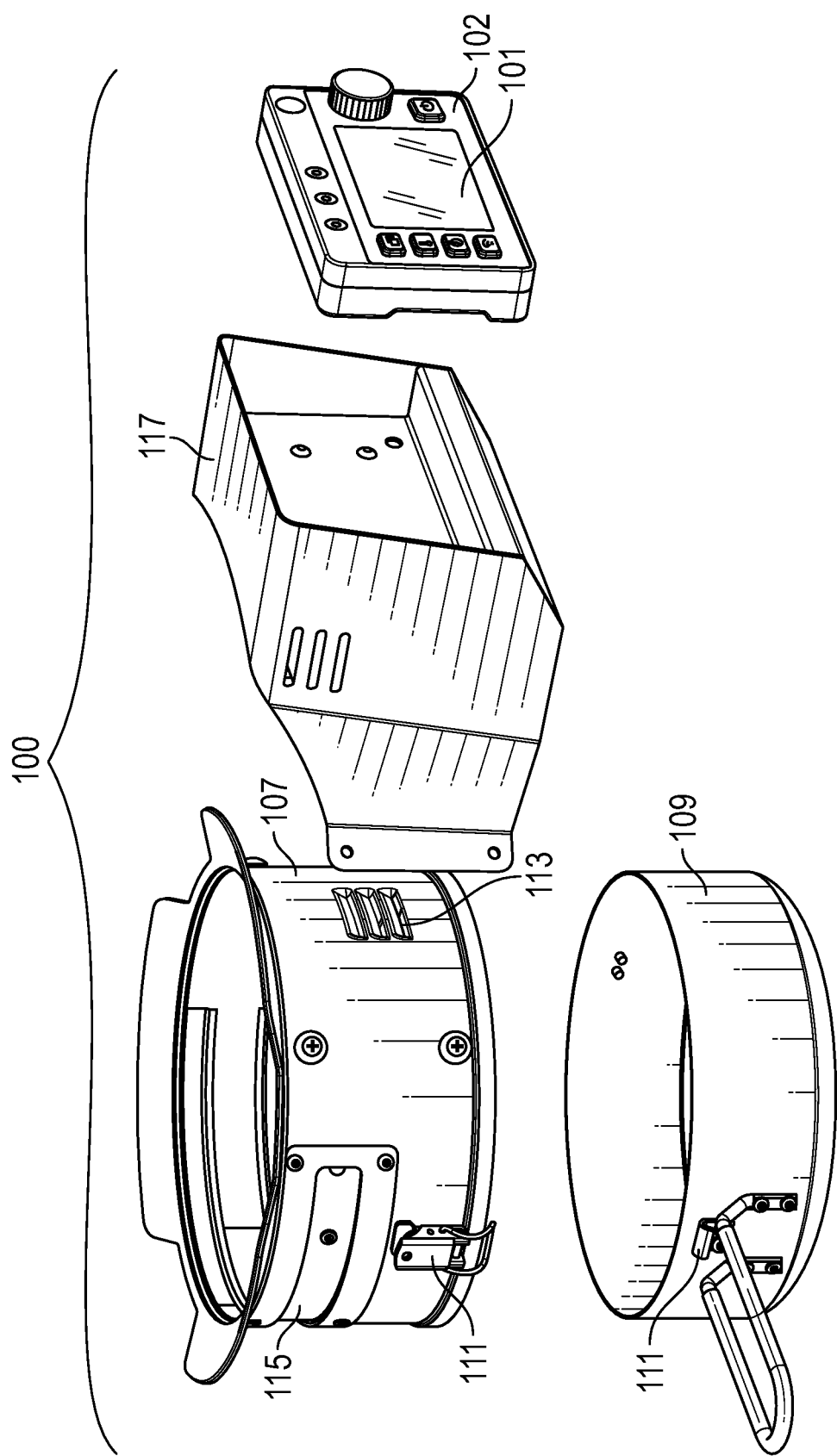
FIG. 2 is an exploded view of the exemplary embodiment shown in FIG. 1.
Figure 3:
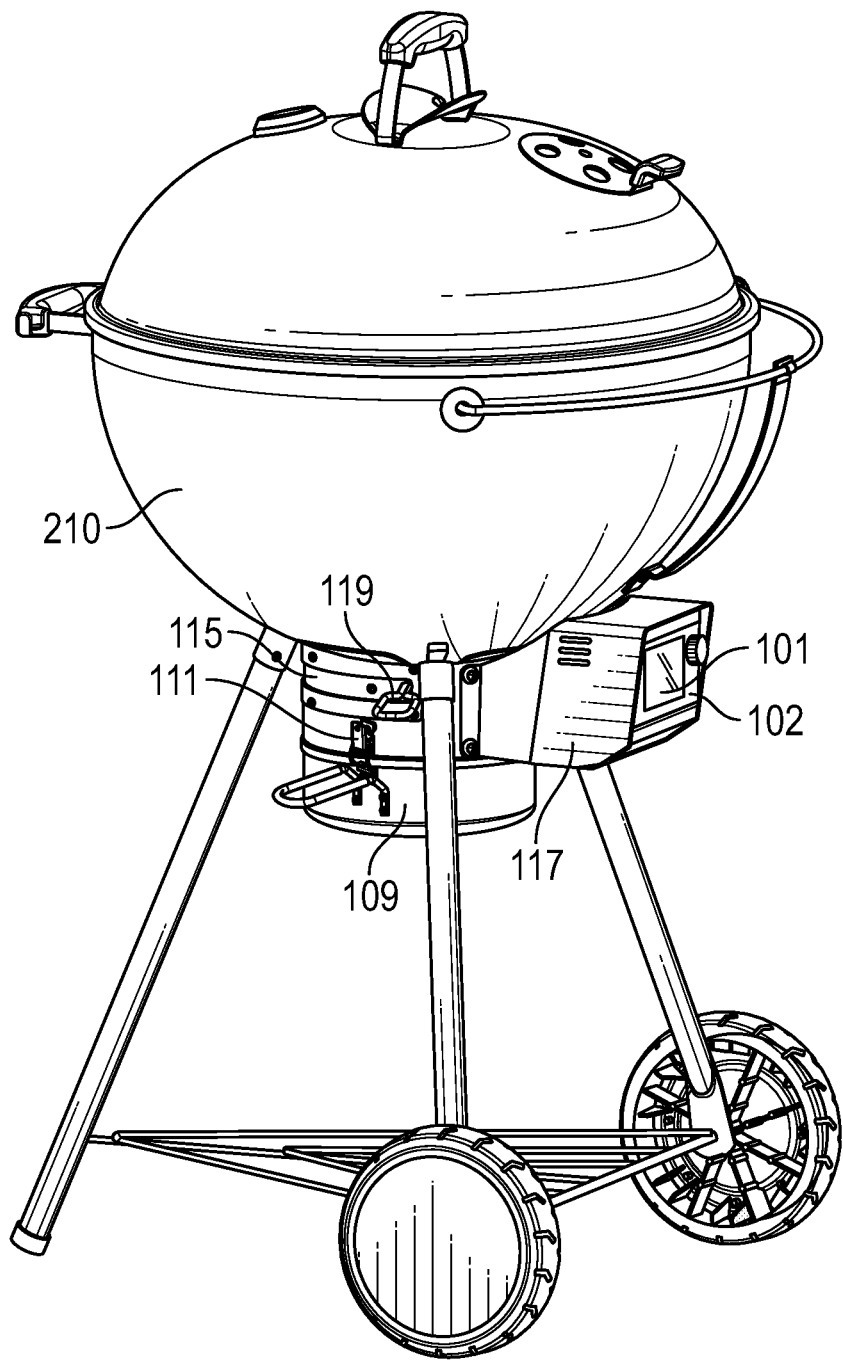
FIG. 3 illustrates the exemplary embodiment of FIG. 1, shown mounted to a kettle-styled grill.
Figure 4:
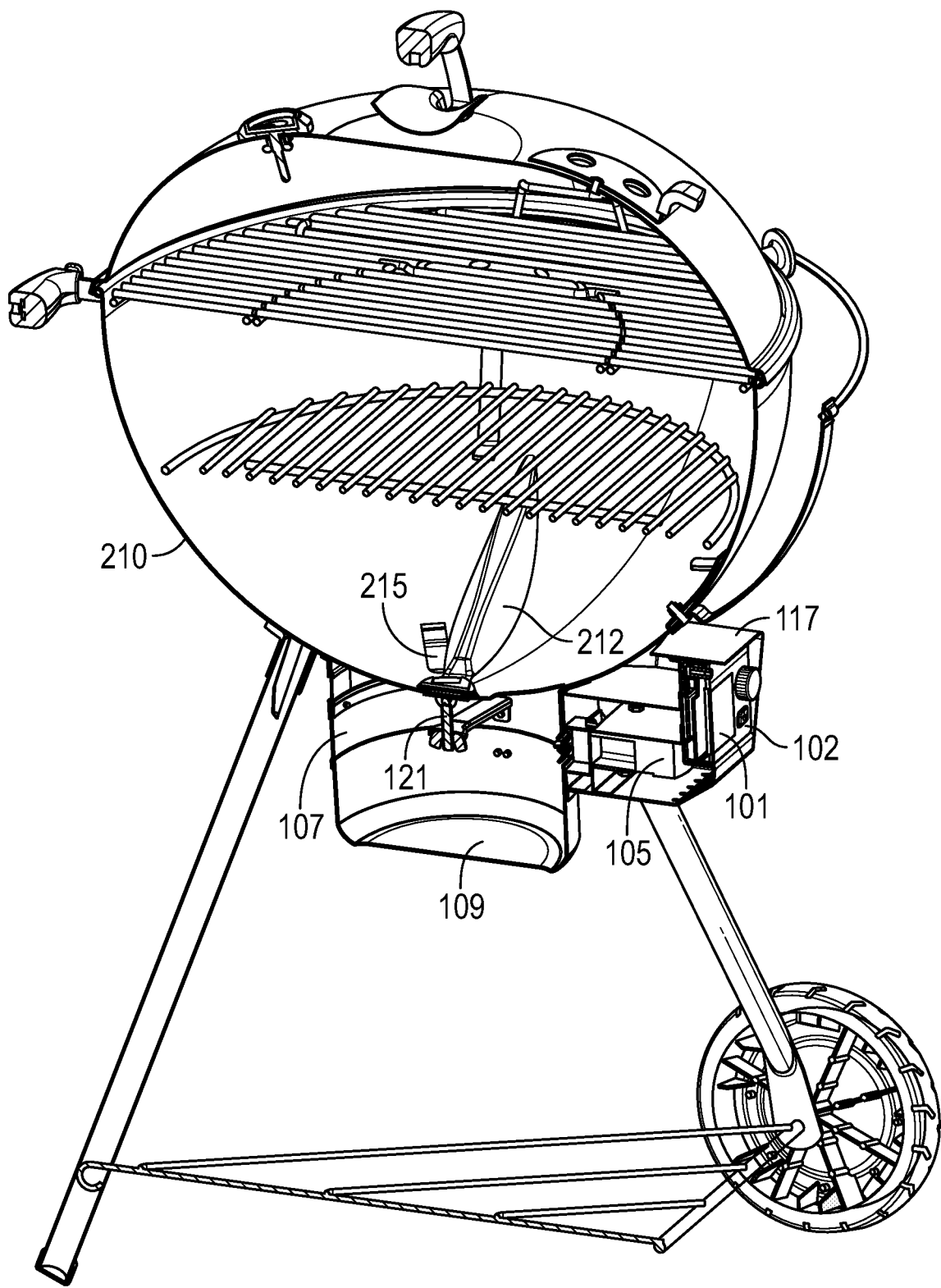
FIG. 4 is a sectioned view of the FIG. 3 illustration to illustrate the exemplary linkage between the novel system and the lower dampers of the kettle-styled grill.
Figure 5:
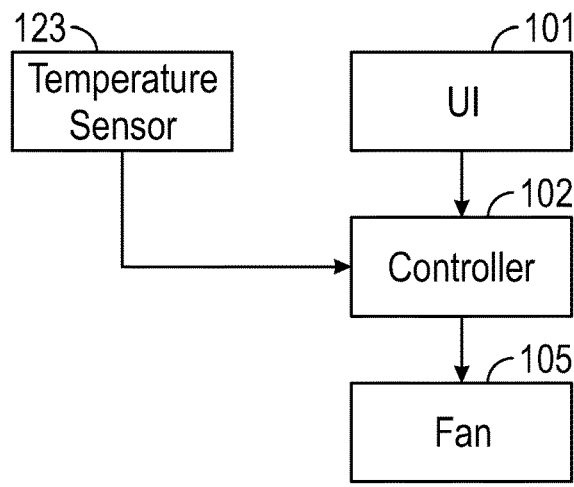
FIG. 5 is a functional block diagram of the electrical components comprised within an exemplary embodiment of the solution for a bimodal air control system for kettle-styled grills.

Turning now to the FIGS. 1-6, an exemplary embodiment of a bimodal air control system 100 will be shown and described with collective reference to the illustrations in FIGS. 1-5. That is, each of the illustrations in FIGS. 1-5 will be described simultaneously. FIG. 1 generally illustrates an exemplary embodiment of a bimodal air control system 100 for kettle-styled grills according to the solution, while FIG. 2 illustrates an exploded view of same. FIGS. 3 and 4 illustrate the exemplary embodiment attached to a kettle-styled grill. FIG. 5 is a functional block diagram of the electrical components comprised within a control system of an exemplary embodiment of the solution for a bimodal air control system for kettle-styled grills.

As should be apparent from the figures, the system 100 may be configured for mounting to the exterior of a kettle-styled charcoal grill. The bimodal air control system 100 may be mated/juxtaposed to the kettle 210 (see, for example, FIGS. 3 and 4) of the grill such that the system 100 is positioned beneath and to the side of the kettle 210. The mating flanges 125 of the damper plenum 107 may form a tight seal with the underside of the kettle.

The damper plenum 107 comprises a manually adjustable intake damper 115 that, when partially open, provides for a restricted intake of a drawn ambient air flow into the inner space of the damper plenum 107 (when the system 100 is in the manual damper mode) and, when fully closed, prevents inflow of ambient air into the damper plenum 107 while simultaneously preventing outflow of a forced air flow injected into the plenum 107 via a fan 105 (when the system is in the auto damper mode). Air flow into the plenum 107, whether from a drawn ambient air flow or a forced air flow generated by fan 105 (or a combination of both), may exit the damper plenum 107 and enter the kettle 210 of the grill via open lower damper holes 215 (see FIG. 4).

To be clear, manipulation of the adjustable intake damper 115 position via handle 119 corresponds with manipulation of damper blade 212 positions within the kettle 210 in order to open, restrict, or close off lower damper holes 215 in the kettle. The intake damper 115 may be mechanically connected to the damper blades 212 via connection 121 in order for adjustment of the intake damper 115 to correspondingly cause adjustment of the damper blades 212. Generally, when intake damper 115 is fully closed, the lower damper holes 215 may be fully open (due to the position of damper blades 212) and the bimodal air control system 100 may be in auto-damper mode such that the only air flow into the damper plenum 107 (and subsequently into the kettle 210 via open lower damper holes 215) is a forced air flow attributable to electric fan 105. And, when the intake damper 115 is fully open, the lower damper holes 215 may be fully closed (due to the position of damper blades 212) and the bimodal air control system 100 may be in shutdown mode such that no air is allowed to flow into the kettle 210 from damper plenum 107. When the intake damper 115 is partially open, the lower damper holes 215 may also be partially open (due to the position of damper blades 212) to modulate air flow into the kettle 210 and the bimodal air control system 100 may be in manual damper mode. When the system 100 is in manual damper mode, a drawn ambient air flow may be pulled into the damper plenum 107 and, subsequently, into the kettle 210. Depending on embodiment of the solution, the fan 105 may provide a supplemental forced air flow into the damper plenum 107 when the system 100 is in a manual damper mode.

As one of ordinary skill in the art of kettle-styled grills would understand, manipulation of the damper blades 212 within the kettle may agitate ash and cause the ash to exit the kettle through lower damper holes 215. The ash may fall gravitationally through the damper plenum 107 and collect in ash can or ash receptacle 109. The ash can 109 may be releasably connected to the lower portion of the damper plenum 107 via a latch 111 or other means. In this way, a user of the system 100 may periodically empty collected ash by simply disconnecting the ash can 109 and without any need for disconnecting the damper plenum 107 and/or the entire system 100 from the grill.

Embodiments of the solution may leverage a controller 102 that includes a graphical user interface 101 or the like. The graphical user interface 101 may be local (such as depicted in the figure illustrations) and/or may be remotely displayed on a wirelessly connected user device. The controller 102, along with a fan 105, may be comprised within an air control unit defined by a housing 117 that is configured to mount on the outside of the damper plenum 107 and the kettle 210. The controller 102 may include a processor, memory component(s), wireless transceiver, power supply, etc., as would be understood by one of ordinary skill in the art of electronic controllers. The controller 102 may have stored within its memory any one or more temperature control algorithms that, when executed by the processor, cause a speed adjustment to the fan 105. That is, the controller 102 may be configured to receive temperature set points dictated by the user or, depending on embodiment, a temperature control algorithm may predefine a temperature set point without user input. The temperature setting informs the controller 102 in view of the temperature sensor 123 signal to vary the speed of the fan. The controller 102 may leverage a proportional-integral-derivative ("PID") control algorithm, as would be understood by one of ordinary skill in the art of process control. In this way, the controller 102 may adjust the fan speed, and by extension the flow rate of a forced air flow into damper plenum 107, in response to a temperature reading from temperature sensor 123.

It is further envisioned that embodiments of the controller 102 may be configured to wirelessly communicate with a software application or the like running on a remote user device such as, but not limited to, a smartphone or pad device. In such embodiments, the user interface 101 may be partially comprised of a user interface on the remote user device. The user may leverage the remote user interface 101, and/or the local user interface 101 (as shown in the figures), to adjust selection of the temperature control algorithm and/or monitor feedback data points (e.g., temperature, cooking time, alarms, etc.), as would be understood by one of ordinary skill in the art.

The one or more temperature control algorithms may rely on inputs from a temperature sensor 123 that may be placed on the cooking grate or elsewhere inside the kettle 210. Depending on the particular embodiment, it is envisioned that the solution may leverage temperature sensor feedback from multiple temperature sensors positioned in multiple locations within and/or outside kettle 210. The temperature sensor(s) 123 provides feedback to the controller 102 that, in turn, controls fan speed. By controlling the fan speed, the controller 102 may cause a cooking temperature to be maintained at a desired temperature setting since a forced air flow into the damper plenum through input port 113 will enter kettle 210 via lower damper holes 215 and affect cooking temperature.

Figure 6:
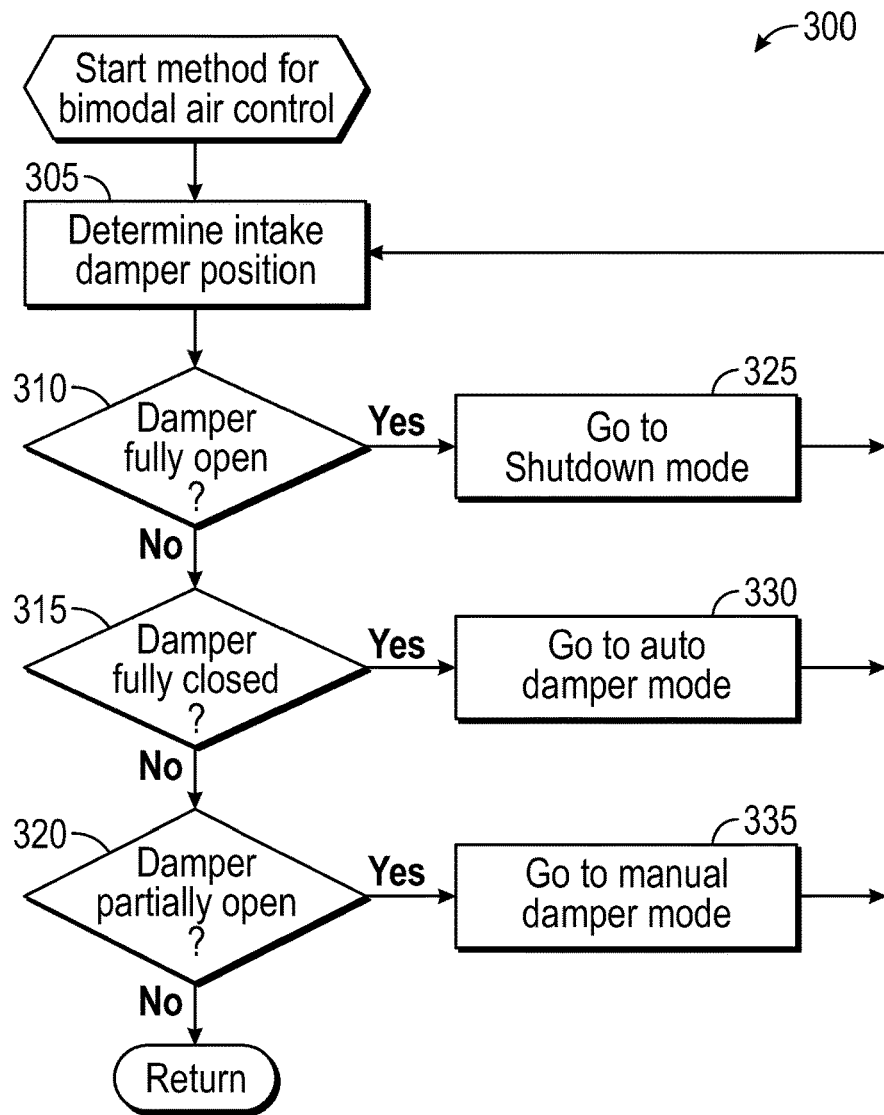
FIG. 6 is a flowchart illustrating an exemplary method for implementing bimodal air control in a kettle-styled grill using a bimodal air control system according to the solution.

FIG. 6 is a flowchart illustrating an exemplary method 300 for implementing bimodal air control in a kettle-styled grill using a bimodal air control system according to the solution. Beginning with block 305, the controller 102 may recognize or determine the position of the intake damper 115. In some embodiments, the controller 102 may rely on a user input to determine the intake damper 115 position while in other embodiments the controller 102 may be configured to receive a position sensor input to determine intake damper 115 position.

Returning to the method 300, at decision block 310 the "yes" branch may be followed if the intake damper 115 is fully open. With the intake damper 115 fully open, the lower damper holes 215 in the kettle 210 may be fully closed. And so, the method 300 may arrive at block 325 and set the system 100 to shutdown mode. In shutdown mode, the controller 102 may cease actuation of fan 105 or, alternatively, may continue to force air through input port 113 into damper plenum 107 in order to improve thermal energy dissipation from kettle 210. The method 300 returns to block 305 to monitor any changes in the position of intake damper 115. If at decision block 310 it is determined that the intake damper 115 is not fully open, however, then the method 300 follows the "no" branch to decision block 315.

At decision block 315 the "yes" branch may be followed if the intake damper 115 is fully closed. With the intake damper 115 fully closed, the lower damper holes 215 in the kettle 210 may be fully open. And so, the method 300 may arrive at block 330 and set the system 100 to auto-damper mode. In auto-damper mode, the controller 102 may modulate the speed of fan 105 based on an input from temperature sensor 123 and, in doing so, provide a forced air flow through input port 113 into damper plenum 107. A drawn ambient air flow into damper plenum 107 may be prevented by virtue of the closed intake damper 115. The forced air flow may enter kettle 210 through the fully open damper holes 215 in order to affect combustion and cooking temperature. The method 300 returns to block 305 to monitor any changes in the position of intake damper 115. If at decision block 315 it is determined that the intake damper 115 is not fully closed, however, then the method 300 follows the "no" branch to decision block 320.

At decision block 320 the "yes" branch may be followed if the intake damper 115 is partially open. With the intake damper 115 partially open, the lower damper holes 215 in the kettle 210 may also be partially open. And so, the method 300 may arrive at block 335 and set the system 100 to manual damper mode. In manual damper mode, the controller 102 may modulate the speed of fan 105 based on an input from temperature sensor 123 and, in doing so, provide a forced air flow through input port 113 into damper plenum 107 that supplements a drawn air flow into damper plenum 107 from partially open intake damper 115. Alternatively, the controller 102 may shut off fan 105 such that the only air flow into damper plenum 107 is a drawn air flow through the partially open intake damper 115. The air flow may enter kettle 210 through the partially open damper holes 215 in order to affect combustion and cooking temperature. The method 300 returns to block 305 to monitor any changes in the position of intake damper 115. If at decision block 320 it is determined that the intake damper 115 is not partially open, however, then the method 300 follows the "no" branch and the method 300 returns.

Exemplary Kamado-Styled Cooker Embodiment

Figure 7:
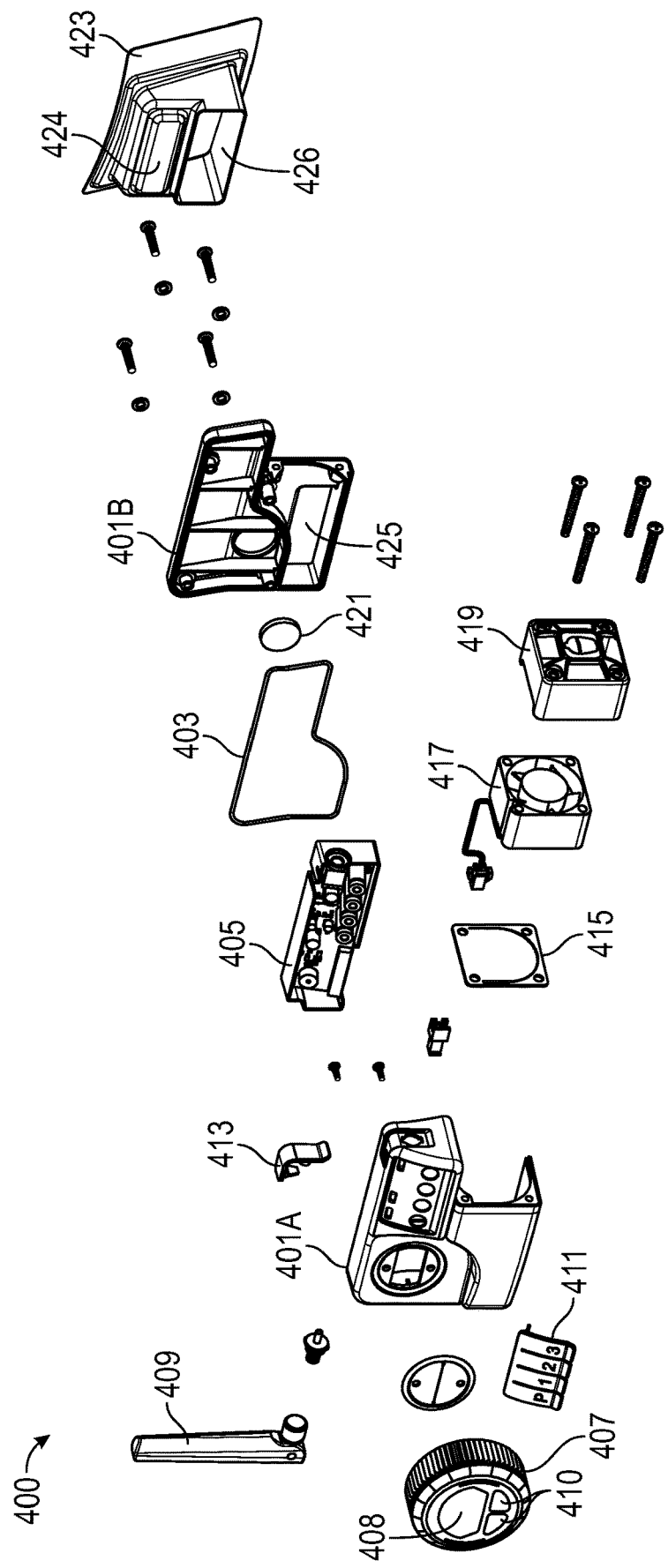
FIG. 7 is an exploded view of an exemplary embodiment of the solution in the form of a forced air control system configured for retrofit to a kamado-style cooker.

Turning now to the FIGS. 7-10, an exemplary embodiment of a retrofittable forced air control system for a kamado-style cooker will be described. FIG. 7 is an exploded view of the exemplary embodiment of the solution in the form of a forced air control system 400 configured for retrofit to a kamado-style cooker. A review of subsequent figures will make clear how the exemplary embodiment is configured for retrofit to a kamado-style cooker.

The forced air control system 400 comprises a "clamshell" styled housing comprised of a front housing body 401A and a rear housing body 401B, although other housing designs, shapes, and configurations are envisioned and within the scope of the solution. The front housing body 401A and the rear housing body 401B may be mated together and sealed with a gasket 403, as would be understood by one of ordinary skill in the art. The housing 401 contains, inter alia, an inner electronic assembly 405. The inner electronic assembly 405 may comprise a control board or "System on a Chip" containing a processor, memory components, power management circuitry, modem, etc., as would be understood by one of ordinary skill in the art of electronics, software, and wireless communications protocols reviewing the present disclosure. The memory may be used to store cooking algorithms for varying and controlling air flow generated by the system 400 in response to temperature inputs. The wireless modem, in communication with WiFi antenna 409 may provide means by which a user of the system 400 may remotely interface with the system 400 over a local WiFi network and/or cellular network via a handheld device (such as a smart phone executing an app) or other user device. It is envisioned that some embodiments may be configured to communicate wirelessly with a user's handheld device via a short wave radio signal such as, for example, Bluetooth®.

The inner electronic assembly 405 may also include a power port for receiving a power source and one or more probe ports for receiving a sensor reading indicative of some variable such as, but not limited to, temperature. The power port may be protected from the elements by a power port cover 413 that is configured to close off the power port when the system 400 is not in use. Similarly, the probe ports may be protected from the elements by a probe port cover(s) 411.

A user interface 407, which may also include its own printed circuit board configured to interface with the main board of the inner assembly 405, may be in the form of a rotatable knob (such as that which is illustrated in the exemplary embodiment), although other user interface designs are envisioned. In the exemplary user interface 407, a series of input buttons 410 and a display 408 are incorporated. A user of the user interface may leverage the knob aspect, the input buttons 410 and/or the display 408 to dictate temperature set points, view temperature feedback, select cooking algorithms, etc.

Notably, a fan 417 (a DC driven fan in the exemplary embodiment) is mounted into and through the housing 401 and is in electronic communication with the inner electronic assembly 405. The fan 417 may be protected from damaging forces by a fan shroud 419. The fan is configured to generate a forced air flow into and through the system 400, exiting through lower duct 425 or rear housing 401B. Between the output side of the fan and the internals of the system 400 may be a flapper component 415 that works as a check valve for allowing an air flow into and through the system 400 while protecting the fan 417 from any backflow that may contain high thermal levels and/or grease or other debris from the cooker. The flapper component 415 may be constructed from a flexible material such as a polymer or rubber.

As can be understood from the exploded view of the FIG. 7 illustration, the assembled housing 401 may be configured to mechanically mate with an adapter 423. The assembled housing 401, and all the components previously described that are housed within or onto the assembled housing collectively form the control unit 402 of the system (see FIG. 8). The adapter 423 is configured to detachably mate with a lower damper of a kamado cooker, as will be more clearly shown and understood from subsequent figures. The adapter 423 defines an airflow duct 426 that is configured to receive the lower duct 425 of the assembled housing 401. As can be understood, a forced air flow generated by the fan 417 may exit the lower duct 425 and pass through the airflow duct 426 of the adapter 423. The adapter 423 may include a baffle component (427 in FIG. 9) for inhibiting backflow of grease or other debris from the cooker into the system 400.

The adapter 423 may also include a surface 424 for interfacing with high temperature magnet 421. Advantageously, for embodiments of the solution that leverage a magnet 421, the system 400 may be securely, yet removably, mounted to the adapter 423.

Figure 8:
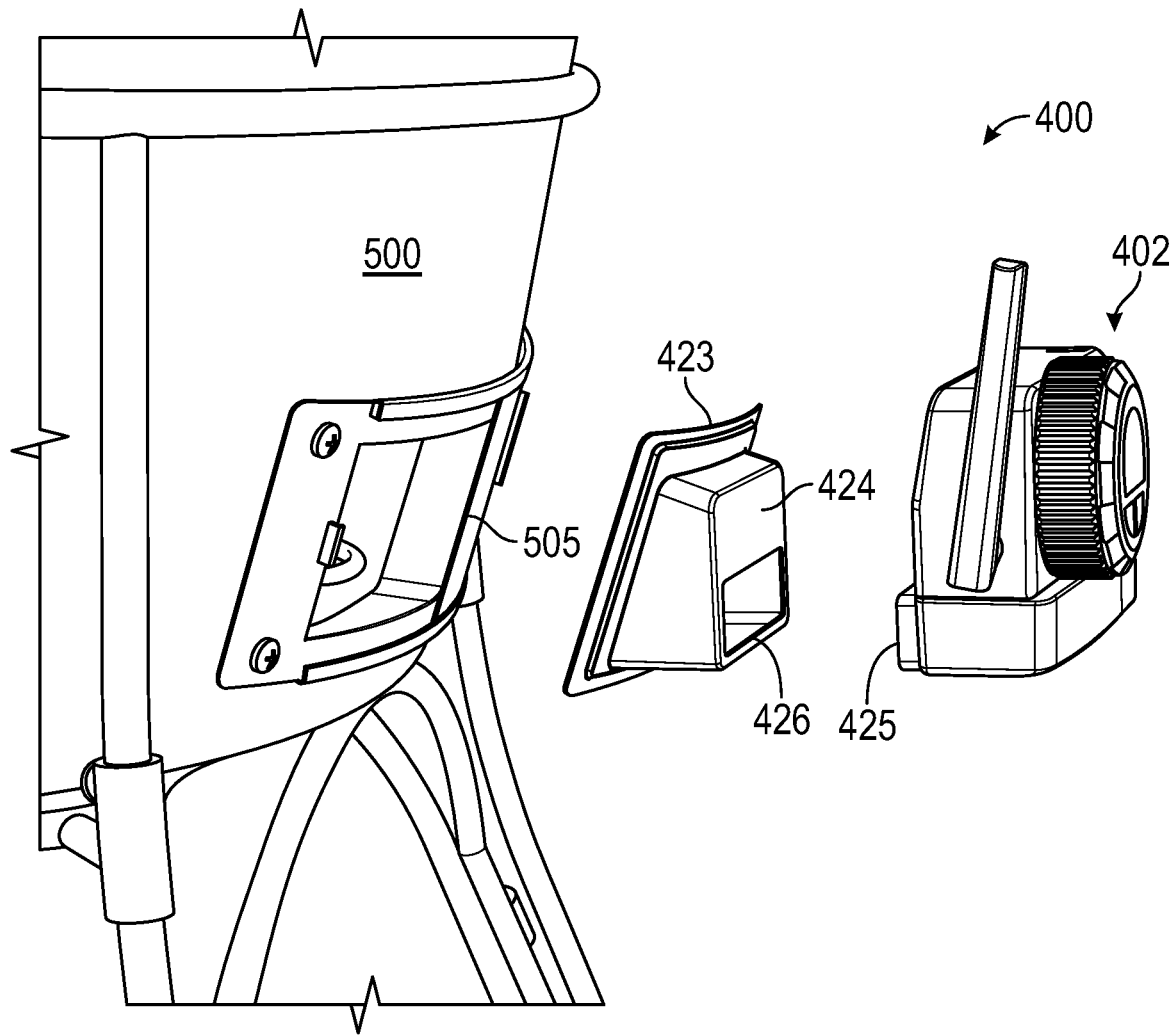
FIG. 8 illustrates the exemplary embodiment of FIG. 7 in its assembled state, with the control unit detached from the adapter frame which is detached from the lower damper port of a kamado-style cooker.

FIG. 8 illustrates the exemplary embodiment 400 of FIG. 7 in its assembled state, with the control unit 402 detached from the adapter frame 423 which is detached from the lower damper port 505 of a kamado-style cooker 500. As can be understood from this FIG. 8 illustration and subsequent figures, the adapter frame 423 is configured to be received onto and over the lower damper port 505 of a kamado-style cooker 500 and, in some embodiments, may be held in place via the damper port door. The edges of the adapter frame 423 may be received into channels or other mechanical attachment means associated with the lower damper port 505. In other embodiments, the adapter frame 423 may be tack welded or otherwise fastened in place over the lower damper port 505 of a kamado-styled cooker 500.

The lower duct 425 of the control unit 402 is received by the airflow duct 426 of the adapter frame 423. As previously described, the control unit 402 may be removably secured to the adapter frame 423 by a magnet 421 positioned to interface with the surface 424.

Figure 9:
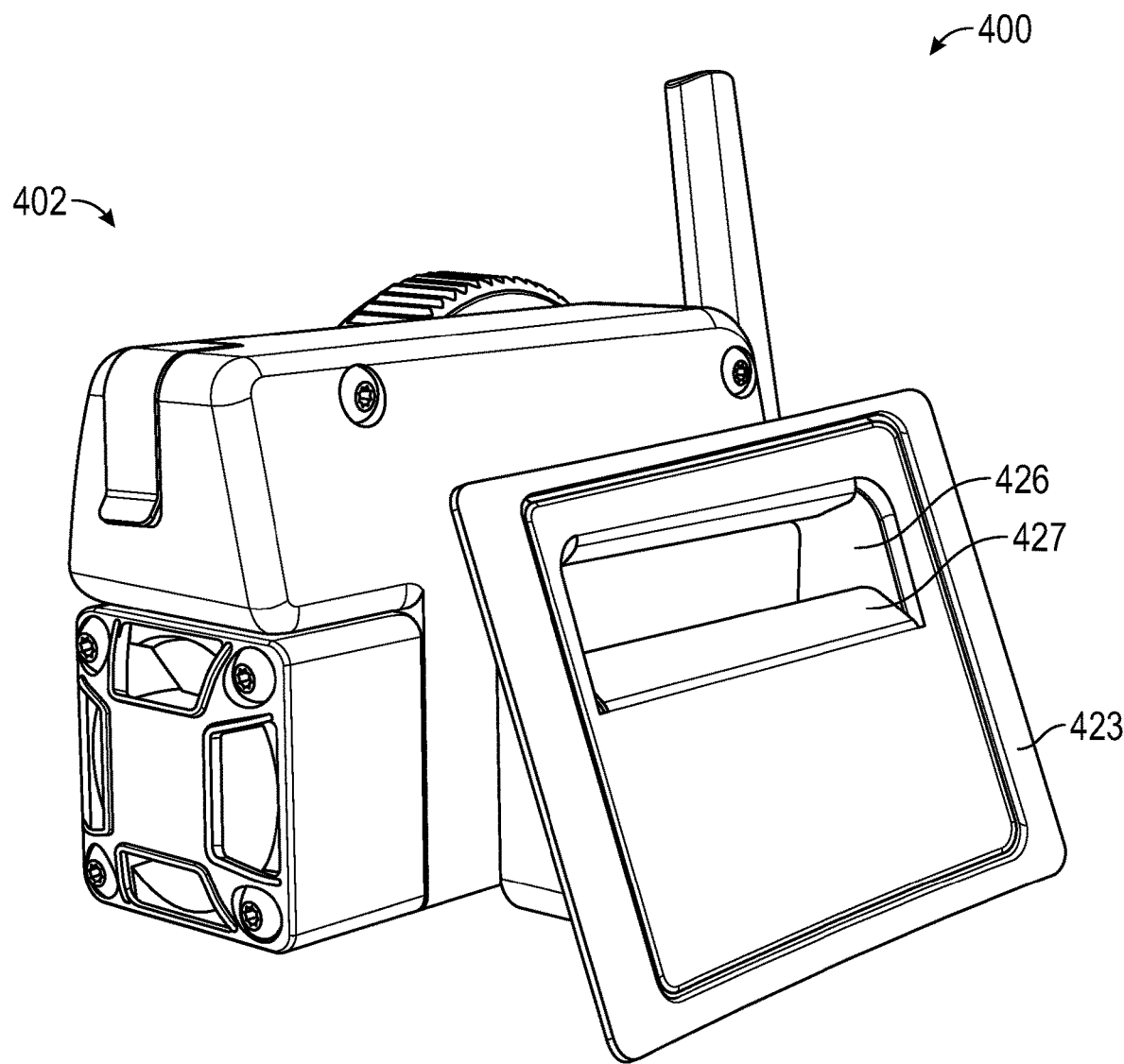
FIG. 9 illustrates a rear view of the exemplary embodiment of FIG. 7 in its assembled state, with the control unit attached to the adapter frame.

FIG. 9 illustrates a rear view of the exemplary embodiment 400 of FIG. 7 in its assembled state, with the control unit 402 attached to the adapter frame 423. The rear view offered by the FIG. 9 illustration, when considered in light of previous illustrations, makes clear that the airflow duct 426 takes a tortuous path through adapter frame 423, beginning at a lower point (as seen FIG. 8) and exiting a higher point (as seen in FIG. 9). Advantageously, the tortuous path, coupled with the baffle 427, works to prevent detrimental backflow of thermal energy and/or debris from the cooker into the control unit 402.

Figure 10:
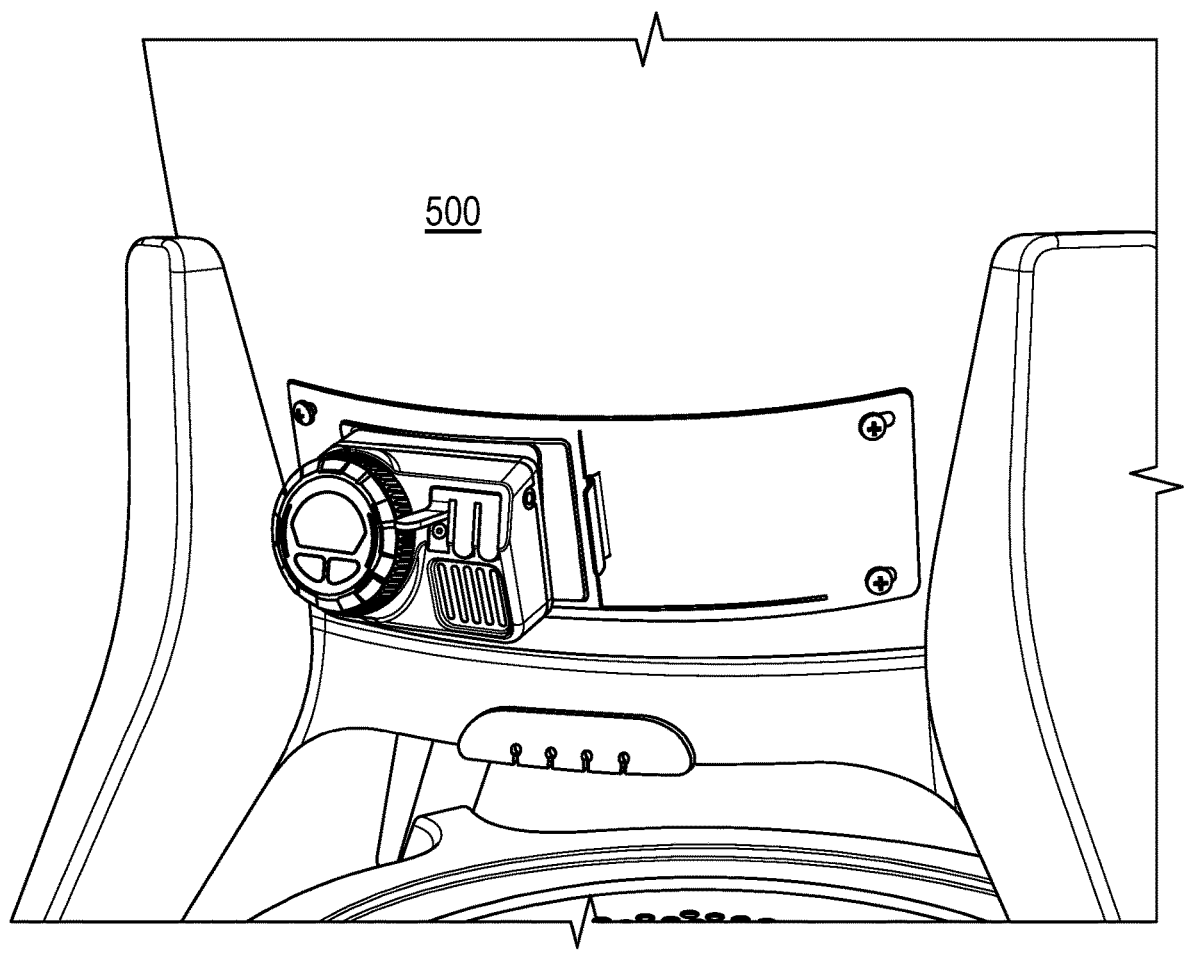
FIG. 10 illustrates the exemplary embodiment of FIG. 7 in its assembled and readily operated state, with the control unit received by the adapter frame which is mechanically mated to a lower damper port of a kamado-style cooker.

FIG. 10 illustrates the exemplary embodiment 400 of FIG. 7 in its assembled and readily operated state, with the control unit 402 received by the adapter frame 423 which is mechanically mated to a lower damper port 505 of a kamado-style cooker 500. With the system 400 mounted to and over the lower damper port 505 via the adapter plate 423, the control unit 402 may be powered (whether by a battery power source within the control unit 402 or a wired power source connected to the power port) such that, in response to temperature signal inputs provided through the probe ports, the fan 417 may be modulated to provide a forced air flow into the cooker 500 similar to that which has been previously described relative to the illustration of FIGS. 1-6.

A system and method for bimodal air control in a kettle-style grill according to the solution, as well as a system and method for forced air control in a kamado-style cooker, has been described using detailed descriptions of embodiments thereof that are provided by way of example and are not intended to limit the scope of the disclosure. The described embodiments comprise different features, not all of which are required in all embodiments of the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that the solution is not limited by what has been particularly shown and described herein above. Rather, the scope of a system and/or method according to the solution is defined by the claims that follow.

What is claimed is:

1. A system for providing a forced air flow into a kamado-style cooker, the system comprising:

an adapter defining an airflow duct with an entrance aperture and an exit aperture, the adapter configured to removably mount over a lower damper port in a kamado-style cooker such that the exit aperture is aligned with the lower damper port, wherein, when the adapter is removably mounted over a lower damper port in a kamado-style cooker, the entrance aperture of the adapter is lower than the exit aperture of the adapter and a center axis of the entrance aperture is parallel to and below a center axis of the exit aperture such that a tortuous flow path is defined through the airflow duct; and a control unit comprising an electric fan, one or more sensor input ports, and an airflow exit duct, wherein the control unit is configured to separably mate with the adapter such that the airflow exit duct of the control unit is received by the entrance aperture of the adapter;

wherein a forced air flow generated by the electric fan passes through the adapter and into a body portion of the kamado-style cooker;

wherein the adapter further comprises a baffle positioned in association with the exit aperture to mitigate a backflow from the cooker into the control unit.

2. The system for providing a forced air flow into a kamado-style cooker of claim 1, the control unit further comprising an electronic controller in electrical communication with the electric fan.

3. The system for providing a forced air flow into a kamado-style cooker of claim 2, further comprising a temperature sensor in electrical communication with the electronic controller via the one or more sensor input ports, wherein the electronic controller is configured to vary speed of the electronic fan based on a signal input from the temperature sensor.

4. The system for providing a forced air flow into a kamado-style cooker of claim 3, wherein the electronic controller varies speed of the electronic fan according to a proportional-integral-derivative control algorithm.

5. The system for providing a forced air flow into a kamado-style cooker of claim 2, wherein the electronic controller is configured to wirelessly communicate with a remote user device.

6. The system for providing a forced air flow into a kamado-style cooker of claim 2, wherein the electronic controller comprises a graphical user interface.

7. The system for providing a forced air flow into a kamado-style cooker of claim 1, wherein the control unit further comprises a magnet positioned to interface with a surface of the adapter.

8. The system for providing a forced air flow into a kamado-style cooker of claim 1, further comprising a flapper component juxtaposed to the electric fan.

* * * * *